United States Patent [19]
Hoshino et al.

[11] Patent Number: 5,755,849
[45] Date of Patent: May 26, 1998

[54] METHOD FOR ELONGATING GLASS PREFORM

[75] Inventors: Sumio Hoshino; Yuichi Ohga; Masumi Ito; Toshio Danzuka; Tatsuhiko Saito, all of Yokohama, Japan

[73] Assignee: Sumitomo Electric Industries, Ltd., Osaka, Japan

[21] Appl. No.: 756,483

[22] Filed: Nov. 26, 1996

[30] Foreign Application Priority Data

Dec. 6, 1995 [JP] Japan ................... 7-317810

[51] Int. Cl.$^6$ ................... C03B 37/07
[52] U.S. Cl. ................... 65/381; 65/382; 65/435
[58] Field of Search ................... 65/381, 382, 404, 65/435, 402, 421

[56] References Cited

U.S. PATENT DOCUMENTS

| | | | |
|---|---|---|---|
| 3,166,395 | 1/1965 | Hicks | 65/402 |
| 3,932,162 | 1/1976 | Blankenship | 65/421 |
| 4,046,536 | 9/1977 | Smithgall | 65/382 |
| 4,163,370 | 8/1979 | Kurth | 65/435 |
| 4,317,666 | 3/1982 | Faure | 65/381 |
| 4,631,079 | 12/1986 | Clark | 65/435 |
| 4,704,151 | 11/1987 | Keck | 65/435 |
| 4,793,840 | 12/1988 | Harding | 65/381 |
| 4,810,276 | 3/1989 | Gilliland | 65/421 |
| 4,875,916 | 10/1989 | Baltzer | 65/381 |
| 5,211,732 | 5/1993 | Abbott | 65/421 |
| 5,320,660 | 6/1994 | Breuls | 65/435 |
| 5,551,967 | 9/1996 | Urruti | 65/382 |

FOREIGN PATENT DOCUMENTS

| | | | |
|---|---|---|---|
| 56-45843 | 4/1981 | Japan . | |
| 4-331734 | 11/1992 | Japan | 65/381 |

OTHER PUBLICATIONS

English Abstract of 4-083726, Japan, Mar. 1992.

*Primary Examiner*—John Hoffmann
*Attorney, Agent, or Firm*—Cushman Darby & Cushman IP Group of Pillsbury Madison & Sutro LLP

[57] ABSTRACT

The present invention relates to a method for precisely elongating a glass preform of an optical fiber body having a desired outer diameter. In this method, a predetermined part of the glass preform is elongated as tensile stress is applied to one end of the glass preform while a predetermined part of the glass preform is heated and softened successively from one end toward the other end of the glass preform. In this elongating operation, while the outer diameter of the softening portion of the glass preform is measured, the tensile stress is adjusted such that the outer diameter of the softening portion coincides with a preset value of the control outer diameter. In particular, this method is characterized in that the preset value of the control outer diameter is changed at least during a predetermined period until termination of elongation or during a predetermined period from the start of elongation.

6 Claims, 9 Drawing Sheets

METHOD FOR ELONGATING GLASS PREFORM

BACKGROUND OF THE INVENTION

1. Field of the Invention

The present invention relates to a method for elongating a glass, which preform is suitable for making an optical fiber.

2. Description of the Related Art

As a method for elongating a glass preform suitable for making an optical fiber to a predetermined outer diameter, there has conventionally been known, for example, a method comprising the steps of heating and softening the glass preform successively from one end portion thereof by means of a heater such as a resistance heating furnace or the like; applying a tensile stress or the like thereto to reduce the diameter of a part of the glass preform; measuring the outer diameter of the reduced part of the glass preform by means of a noncontacting outer-diameter measuring device; and controlling moving speeds of upper and lower chucks so as to apply a tensile stress to the glass preform such that the measured value coincides with a control outer diameter value which is a target value. Such a controlling method is disclosed in Japanese Patent Application Laid-Open No. 4-83726 and No. 56-45843, for example.

In the conventional elongating method, in order to render the outer diameter of the resulting elongated body with a desired value, the outer-diameter measuring device measures the outer diameter of the softened portion of the glass preform which is deformed in a taper form by heating while the tensile stress is applied. In order to coincide the value of the measured outer diameter with the control outer diameter value which has been preset, a moving speed of the upper chuck for feeding the glass preform into a heating furnace and a moving speed of the lower chuck for pulling the glass preform from the heating furnace (the moving speed of the lower chuck is faster than the moving speed of the upper chuck to apply a predetermined tensile stress to the glass preform) are controlled.

While the outer diameter (referred to as "finished outer diameter" hereinafter) of the middle portion of the elongated body thus obtained has a value somewhat smaller than the set value of the control outer diameter, the difference between the set value of the control outer diameter and the finished outer diameter is constant and stable when the middle portion (steady portion) of the glass preform having a steady outer diameter excluding both end portions thereof is being elongated. Accordingly, when a value determined by ascertaining the reduction in diameter from the outer diameter at the measuring position to the finished outer diameter is into consideration and is set as the control outer diameter, and at least one of the moving speeds of the upper and lower chucks is controlled in a feedback manner, the glass preform can be elongated so as to obtain a desirable finished outer diameter.

However, both ends of the glass preform terminate in conical form in which the outer diameter changes greatly. Thus, when a tensile stress is applied to the glass preform so as to attain the set value of the control outer diameter identical to that used for elongating the middle portion (steady portion) of the glass preform, a constant finished outer diameter may not be obtained near both of the end portions. Specifically, while a central part the steady portion (i.e., other than the parts near both the ends of the resulting elongated body) has a constant diameter yielding a desired reduction in diameter, tapered portions near both the ends of the resulting elongated body may have a larger diameter (see FIGS. 10A and 10B). In particular, as shown in FIG. 10B, when the end of the resulting elongated body corresponding to an end portion on an elongation-start end side of the glass preform becomes thick, the portion of the glass preform adjacent the thick end of the resulting elongated body becomes thin as a result of this conventional method.

SUMMARY OF THE INVENTION

It is an object of the present invention to provide a method for precisely elongating a glass preform of an optical fiber to an elongated body having a desired outer diameter.

Figure 1:
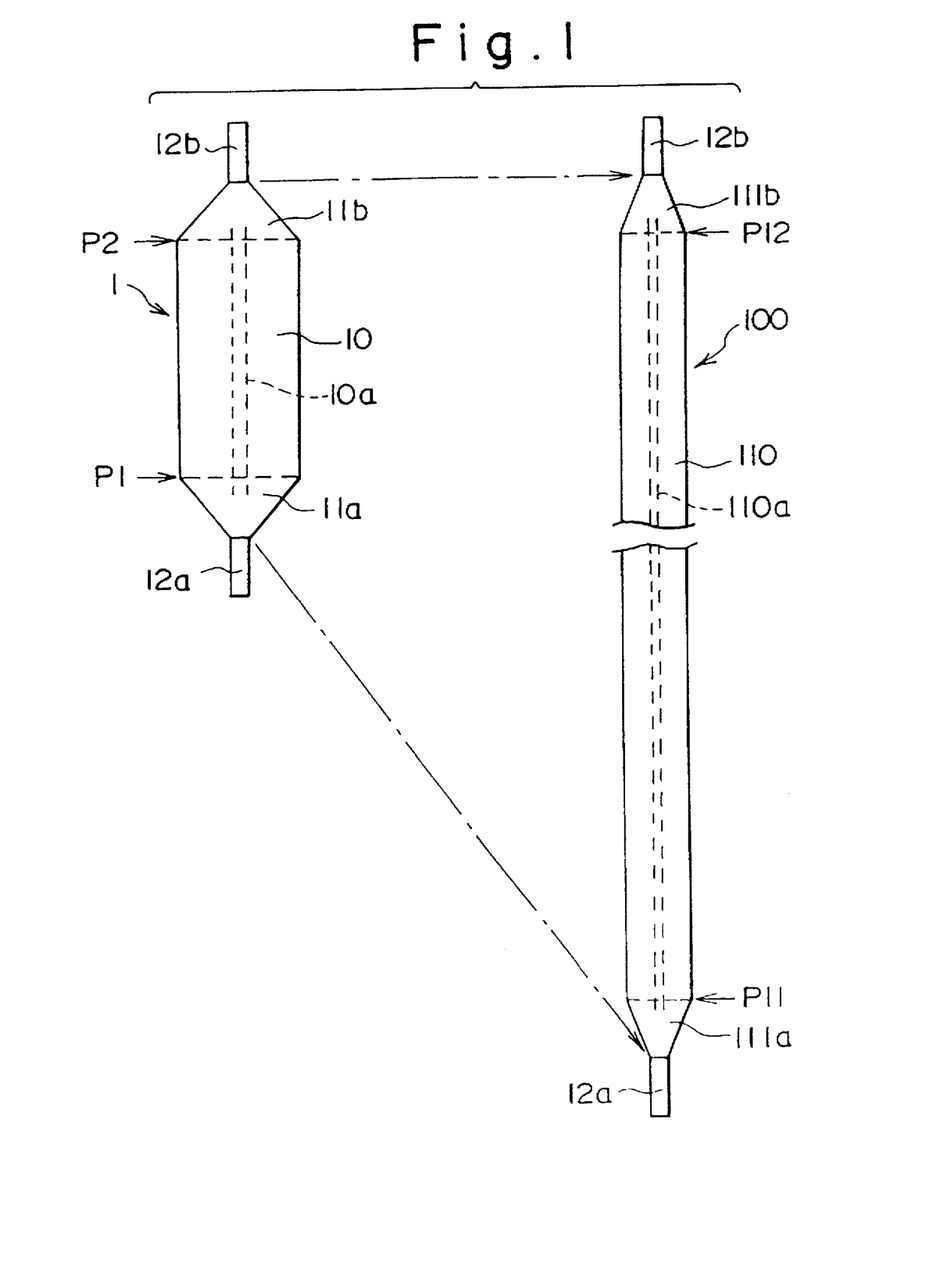
FIG. 1 is a view depicting each part of a glass preform to be elongated and its corresponding part in an elongated body obtained after elongation operation.

In the elongating method according to the present invention, as shown in FIG. 1, a glass preform 1, in which first and second ends (respectively indicated by arrows P1 and P2 in the drawing) of a steady portion 10 having a predetermined outer diameter are respectively provided with first and second tapered portions 11a and 11b, is elongated in its longitudinal direction so as to yield an elongated body 100 having a desired outer diameter. Disposed within this glass preform 1 is a region (referred to as "core region" hereinafter) 10a which is to become a core of an optical fiber and extends in the longitudinal direction, while dummy rods 12a and 12b are respectively attached to the first and second tapered portions 11a and 11b to facilitate their handling. On the other hand, in the elongated body 100, the ends (portions indicated by arrows P11 and P12 in the drawing respectively corresponding to the ends P1 and P2 in the steady portion 10 of the glass preform 1) have tapered portions 111a and 111b (respectively corresponding to the first and second tapered portions 11a and 11b of the glass preform 1).

Figure 2:
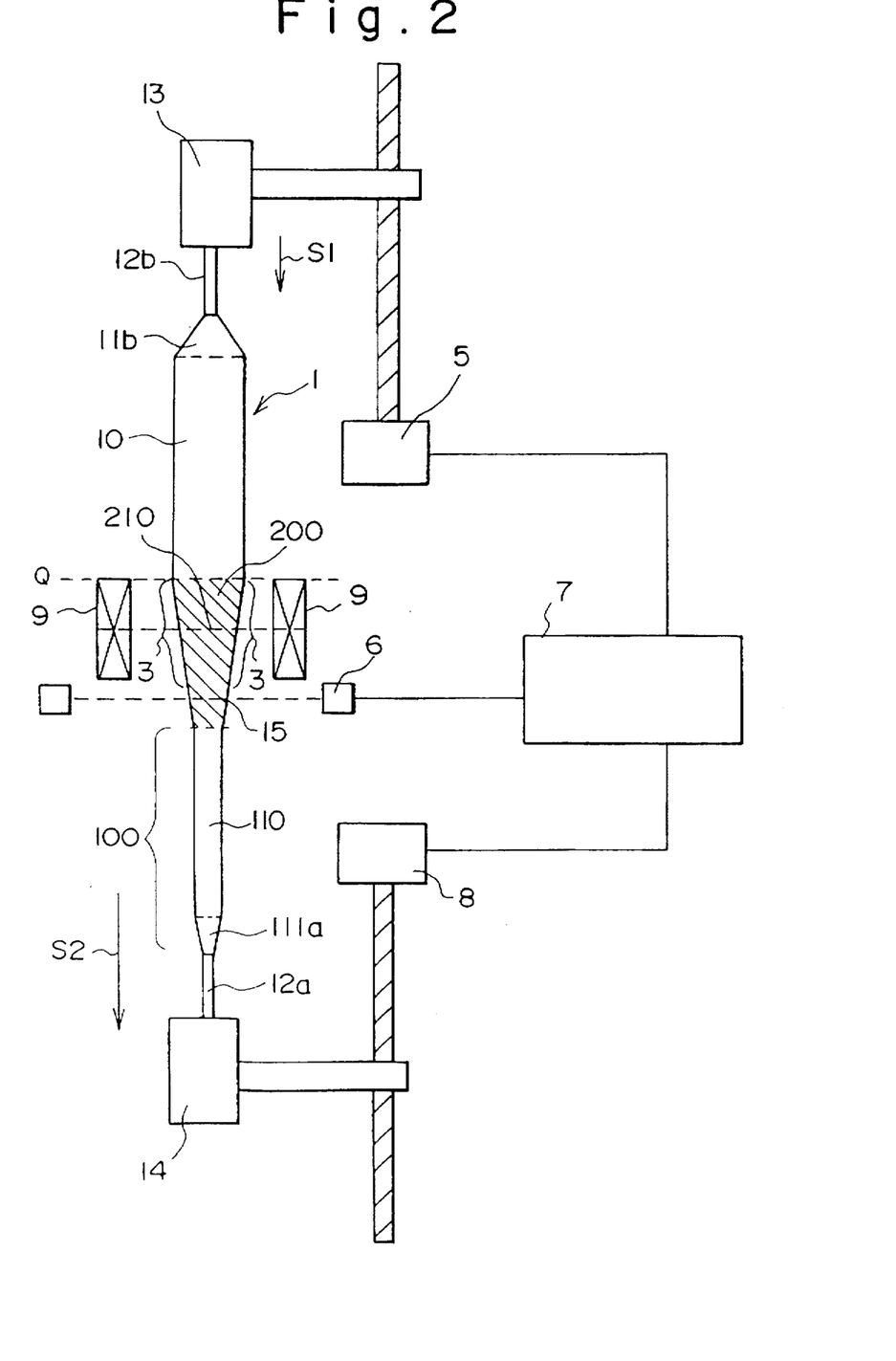
FIG. 2 is a view showing a configuration of an apparatus for performing the elongating method according to the present invention.

Specifically, the elongating method according to the present invention is performed by means of an elongating apparatus shown in FIG. 2. First, in this elongating method, the dummy rod 12b of the glass preform 1 is gripped by an upper chuck 13 while the dummy rod 12a is gripped by a lower chuck 14, whereby the glass preform 1 is set to the elongating apparatus of FIG. 2. The upper chuck 13 feeds the glass preform 1 into a heater 9 such as a resistance heating furnace or the like at a predetermined speed (first speed) along the direction indicated by the arrow S1 in the drawing. Accordingly, the glass preform 1 is heated at its portion (heating portion) positioned in the heater 9 successively from the first tapered portion 11a toward the second tapered portion 11b, whereby a predetermined portion (softened portion 200) including the heating portion is softened (heating process). On the other hand, the lower chuck 14 moves along the moving direction of the upper chuck 13 (along the direction indicated by the arrow S2 identical with that indicated by the arrow S1) faster than the upper chuck 13, thereby applying a tensile stress to the glass preform 1 whose predetermined portion is softened while cooperating the upper chuck 13 (elongating process). Accordingly, the glass preform 1 becomes an elongated body which is elongated by the difference between the distance of movement of the upper chuck 13 and that of the lower chuck 14. Here, the outer diameter of the elongated body 100 is controlled as a control unit 7 controls the speed of movement of at least one of the upper chuck 13 and lower chuck 14 in a feedback manner by measuring the outer diameter at a predetermined position 15 in the softened portion 200 of the above glass preform 1 by means of an outer-diameter measuring device 6, so as to make the measured value coincide with a set value of control outer diameter which has been preset (control process).

In particular, the elongating method according to the present invention is characterized in that the above set value of the control outer diameter is changed at least during a period from a time when the distance between the second end P2 of the steady portion 10 of the above glass preform 1 and an opening position (position indicated by Q in the drawing) of the heater 9 has become a predetermined value to a time when the elongation operation (including the elongating process) is terminated. Here, the set value of the control outer diameter may be changed as being either reduced stepwise or altered continuously in response to the distance of movement of the glass preform 1 fed into the heater 9.

Also, the apparatus of FIG. 2 applies a desired tensile stress to the glass preform 1 by utilizing the difference in speed (difference of the distance of movement) between the upper chuck 13 and the lower chuck 14, thereby adjusting the outer diameter of the resulting elongated body 100. Accordingly, during the period for changing the set value of the control outer diameter, the outer diameter of the elongated body 100 is controlled as the moving speed of at least one of the upper chuck 13 and lower chuck 14 is adjusted such that the measured value coincides with the set value. In particular, this speed control includes an operation for stopping the upper chuck 13 used for feeding the glass preform 1 into the heater 9 during a period from a predetermined time to the time when the elongation operation is terminated. Here, in the elongating apparatus of FIG. 2, the chuck can be stopped when the set value of control diameter is set to zero.

Further, in the elongating method according to the present invention, the set value of the control outer diameter may be changed not only during the predetermined period including the time when the elongation operation is terminated such as that mentioned above but also during a predetermined period from the time when the elongation operation is started. Namely, the above set value of the control outer diameter is changed during a period from the time when the elongation operation is started to a time when the distance between the first end P1 of the steady portion 10 of the glass preform 1 and the opening position Q of the heater 9 has become a predetermined value.

The set value of the control outer diameter may be changed by being increased either stepwise or continuously in response to the amount of movement of the glass preform 1 fed into the heater 9.

Here, in this specification, "time when the elongation operation is started" refers to a time when at least the lower chuck 14 for applying a tensile stress to the glass preform 1 starts moving, whereas "time when the elongation operation is terminated" refers to a time when the lower chuck 14 is stopped.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, the elongating method according to the present invention will be explained with reference to FIGS. 1 to 9.

In FIG. 1, the middle portion of a glass preform 1 to be elongated has a cylindrical form. Both end portions of an end portion (first tapered portion) 11a on the elongation-start end side of the glass preform 1 and an end portion 11b (second tapered portion) on the elongation-stop end side of the glass preform 1 are terminated as being processed into a conical form. Further, dummy rods 12a and 12b are respectively attached to the tips of these first and second tapered portions 11a and 11b to facilitate their handling.

FIG. 2 is a view showing a configuration of an apparatus for performing the elongating method according to the present invention, showing an intermediate state in the elongating the above glass preform 1. In FIG. 2, numeral 9 refers to a vertical heating furnace (included in a resistance heating furnace). Numeral 200 denotes a softened portion (portion deformed in a taper form by heating while applying a tensile stress) of the glass preform 1 during elongation for the glass preform 1. The softened portion 200 is designed with hatching. Specifically, the softened portion 200 refers to a taper shape which extends from a position corresponding to the upper end of the vertical heating furnace 9 through a heated portion 3 and a measured part 15 of outer diameter to an end part of a steady portion 110 of an elongated body 100. The heated portion 3 is portion of the glass preform 1 heated during elongation operation by the vertical heating furnace 9, and constitutes a part of the heat-softened portion 200 residing in the vertical heating furnace 9. Numeral 210 refers to an outer peripheral portion (hereinafter, referred to as "heated center portion") of the heated portion 3 which corresponds to the center position in the longitudinal direction of the vertical heating furnace 9. In general, the heated center portion 210 has the highest temperature and the lowest viscosity in comparison with other parts, thereby being a part which is the most sensitive to the speed of the upper chuck 13 (determined on the basis of factors of the thickness and the like of the glass preform 1) and tensile stress.

Numeral 6 refers to an outer-diameter measuring device which radiates a laser beam so as to measure the outer diameter at the predetermined part 15 of the softened portion 200 in a noncontacting manner. As to the part 15 to be measured, an optimal position separated from the end (corresponding to the opening position Q of the heating furnace 9) of the softened portion 200 by a predetermined distance along the advancing direction (indicated by arrows S1 and S2) is empirically selected by trial and error. When the outer diameter of the measured part 15 and a set value of control outer diameter are compared with each other, the tensile stress applied to the glass preform 1 is adjusted.

Numeral 14 refers to a lower chuck for gripping the dummy rod 12a disposed at the elongation-start end of the glass preform 1 to be elongated; numeral 13 refers to an upper chuck for gripping the dummy rod 12b located at the elongation-stop end of the glass preform 1. Numeral 8 is a driving motor for moving the lower chuck 14 at a predetermined speed in the direction indicated by the arrow S2, whereas numeral 5 is a driving motor for moving the upper chuck 13 at a predetermined speed (slower than that of the lower chuck 14) in the direction indicated by the arrow S1. The glass preform 1 is thereby elongated with cooperation of these motors.

The apparatus of FIG. 2 applies a tensile stress to the glass preform 1 by the difference between the moving speeds of the upper and lower chucks 13 and 14. That is, the difference between the distance of movement per unit time of the upper chuck 13 and the distance of movement per unit time of the lower chuck 14 corresponds to the length of elongation per unit time. Accordingly, the moving speeds of the upper and lower chucks 13 and 14 are controlled by comparing a measured value of outer diameter at the measured part 15 of the softened portion 200 with a set value of the control outer diameter. The moving speeds are controlled as follows: when the measured value is larger than a set value of the control outer diameter which has been preset, the difference of speed between the upper chuck 13 and the lower chuck 14 increases; when the measured value is smaller than the set value of the control outer diameter, the difference of speed thereof decreases. The pulling operation of the lower chuck 14 performs a function of elongating the glass preform 1 mainly. Also, the feeding operation of the upper chuck 13 performs a function of regulating the moving speed and distance of movement of the glass preform 1. Here, the speeds of these upper and lower chucks 13 and 14 are controlled with consideration being given to the change in heat capacity due to the change in outer diameter. The smaller the outer diameter (outer diameter of the steady portion 10 in particular) of the glass preform 1, the faster the moving speeds of the upper and lower chucks 13 and 14; the larger the outer diameter of the glass preform 1, the slower the moving speeds of the upper and lower chucks 13 and 14.

Numeral 7 refers to a control unit for adjusting independently the moving speeds and distances of movement of the foregoing upper and lower chucks 13 and 14, and compares the outer diameter value of the measured part 15 measured by the outer-diameter measuring device 6, with the preset control outer diameter, to determine the moving speed of the lower chuck 14 and/or the moving speed of the upper chuck 13, thereby driving the driving motors 8 and 5.

The elongation operation of the glass preform 1 in the elongating apparatus of FIG. 2 will be described with reference to FIGS. 3A to 3C. Note that FIGS. 3A to 3C as described above are views showing an elongating method according to the present invention in time series.

Figure 3A:
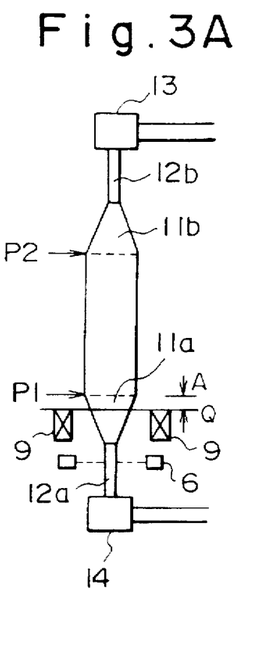
FIGS. 3A to 3C are conceptual views depicting how a glass preform changes in form from the time when elongation operation is started until the time when elongation operation is terminated.

First the glass preform 1 determined previously in its shape and dimension is set on the elongating apparatus such that the dummy rods 12a and 12b are gripped by the lower chuck 14 through the heating furnace 9, and the upper chuck 13, respectively (see FIG. 3A). In general, the glass preform 1 is set such that the lower end (portion indicated by the arrow P1) of the steady portion 10 of the glass preform 1 is located above an opening position Q of the heating furnace 9 (A>0 mm). When the first tapered portion 11a of the glass preform 1 set is short in the longitudinal direction with respect to a size of the heating furnace 9, the lower end P1 of the steady portion 10 of the glass preform 1 is located in the heating furnace 9. However, the interval A between the lower end P1 of the steady portion 10 and the opening position Q of the heating furnace 9 is typically set in the range of 0 mm to 100 mm.

Figure 3B:
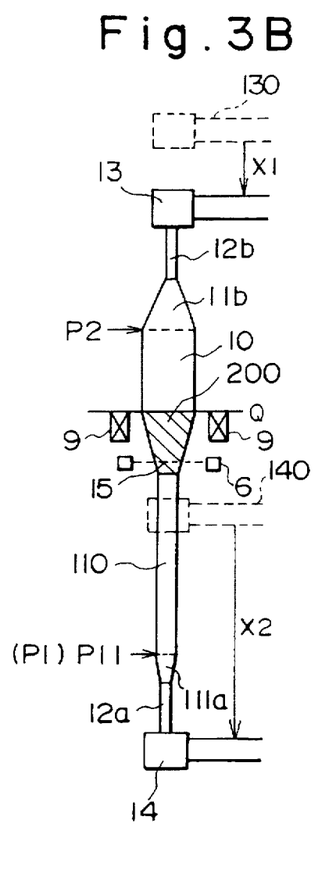
Figure 3C:
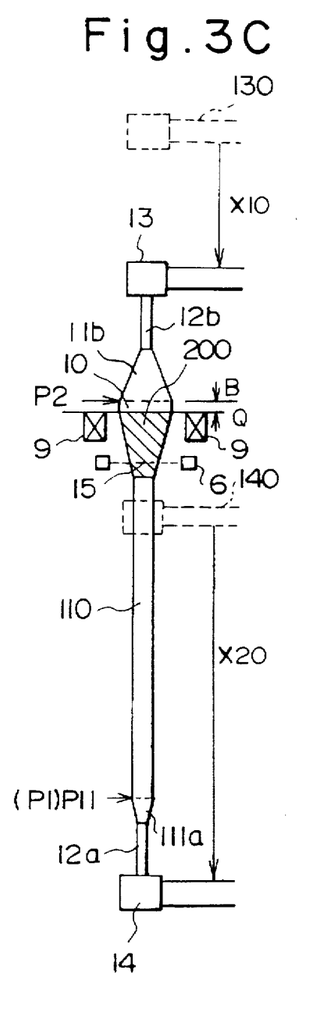

The elongation of the steady portion 10 of the glass preform 1 is conducted successively from a state shown in FIG. 3B to a state shown in FIG. 3C. That is, FIG. 3B shows a state (state that the glass preform 1 is elongated by (X2−X1)) at the time that the upper chuck 13 moves from a setting position (corresponding to the position 130 indicated by dotted lines in the drawing) by X1, and the lower chuck 14 moves from a setting position (corresponding to the position 140 indicated by dotted lines in the drawing) by X2. On the other hand, FIG. 3C shows a state (state that the glass preform 1 is elongated by (X20−X10)) at the time that the upper chuck 13 moves from a setting position (corresponding to the position 130 indicated by dotted lines in the drawing) by X10, and the lower chuck 14 moves from a setting position (corresponding to the position 140 indicated by dotted lines in the drawing) by X20.

Thus, when the steady portion 10 of the glass preform 1 is elongated, its outer diameter is constant; accordingly, a finished outer-diameter (outer diameter of the steady portion 110 of the elongated body 100) is reduced at a substantially constant speed with respect to the outer diameter at the measured part 15 of the softened portion 200. For this reason, the control unit 7 controls a tensile stress to be applied to the glass preform 1 by comparing a value of outer diameter of the measured part 15 obtained from the outer-diameter measuring device 6 with a set value of the control outer diameter in order to coincide the measured value with the set value. More specifically, in the elongating apparatus of FIG. 2, when a predetermined difference between the moving distance of the upper chuck 13 and that of the lower chuck 14 is provided (moving distance per unit time of the lower chuck 14 is provided larger than that of the upper chuck 13), the tensile stress is applied to the glass preform 1. Accordingly, when the moving speed of the upper chuck 13 and/or the moving speed of the lower chuck 14 are adjusted, the length of elongation per unit time of the glass preform 1 is varied. Consequently, the finished outer-diameter of the resultant elongated body 100 is controlled.

Figure 4A:
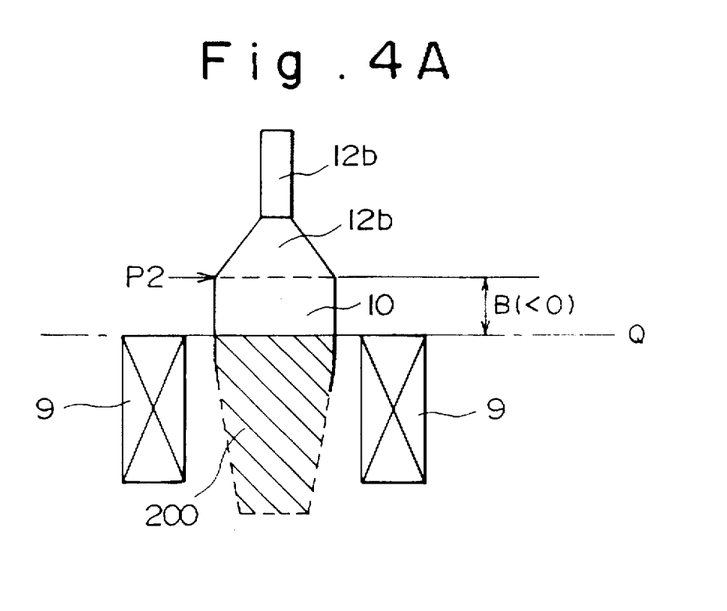
FIGS. 4A and 4B are views depicting positional relationships between the glass preform and a heater shown in FIG. 3C.
Figure 4B:
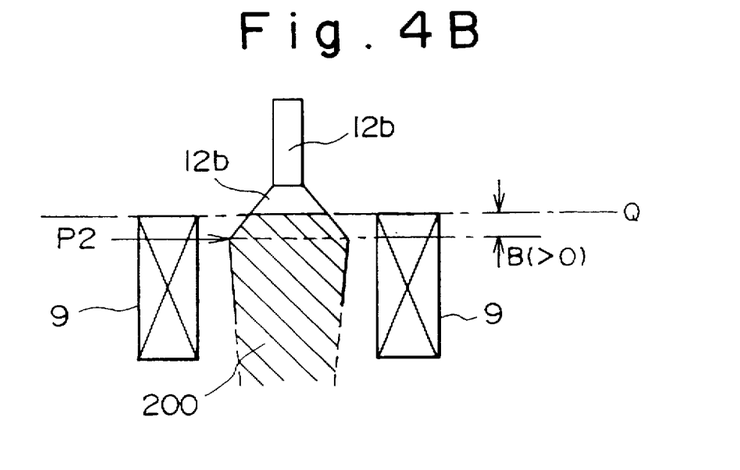
Figure 5:
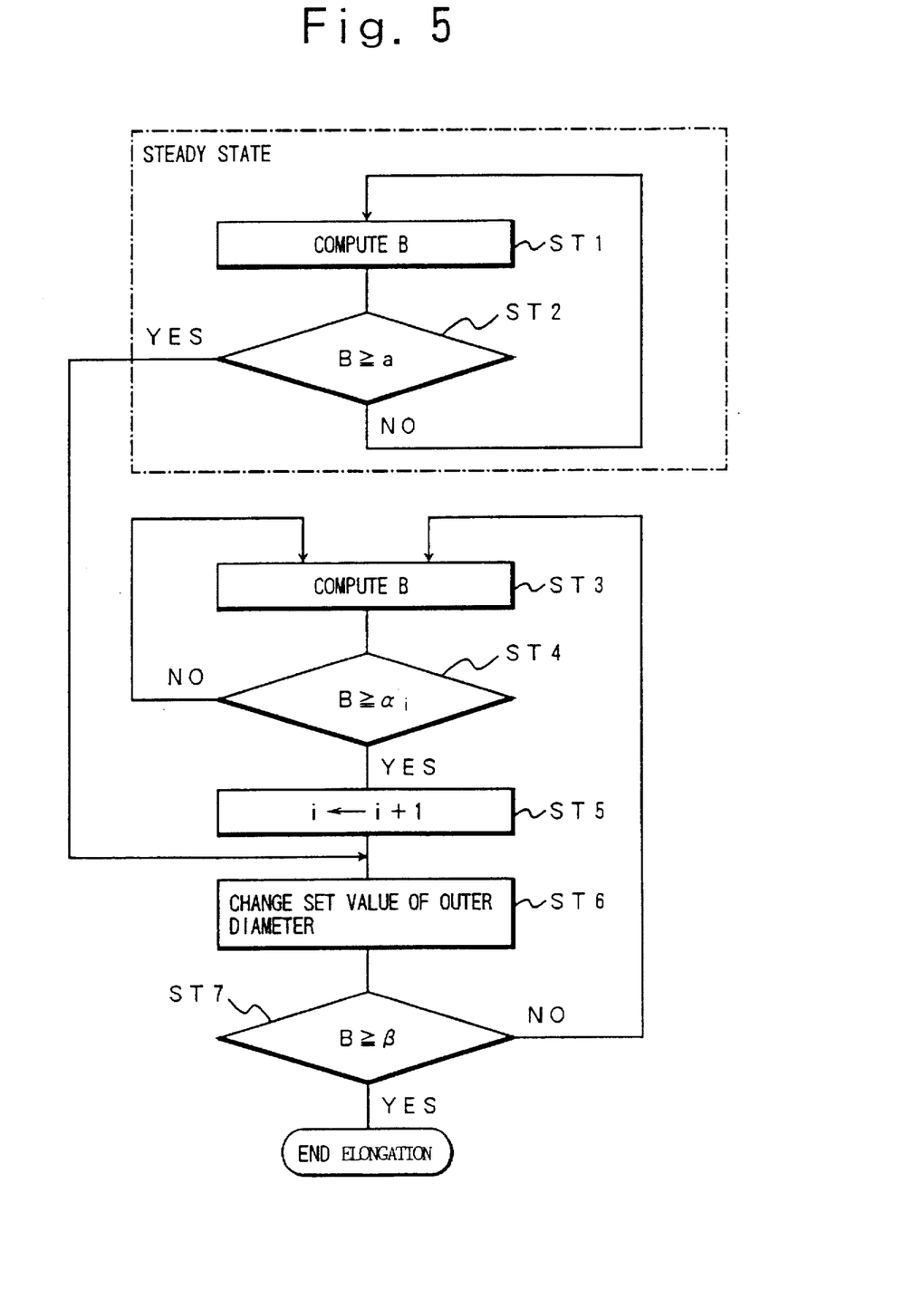
FIG. 5 is a flow chart summarizing an end portion elongating operation during a predetermined period until the termination of elongation operation.
Figure 6:
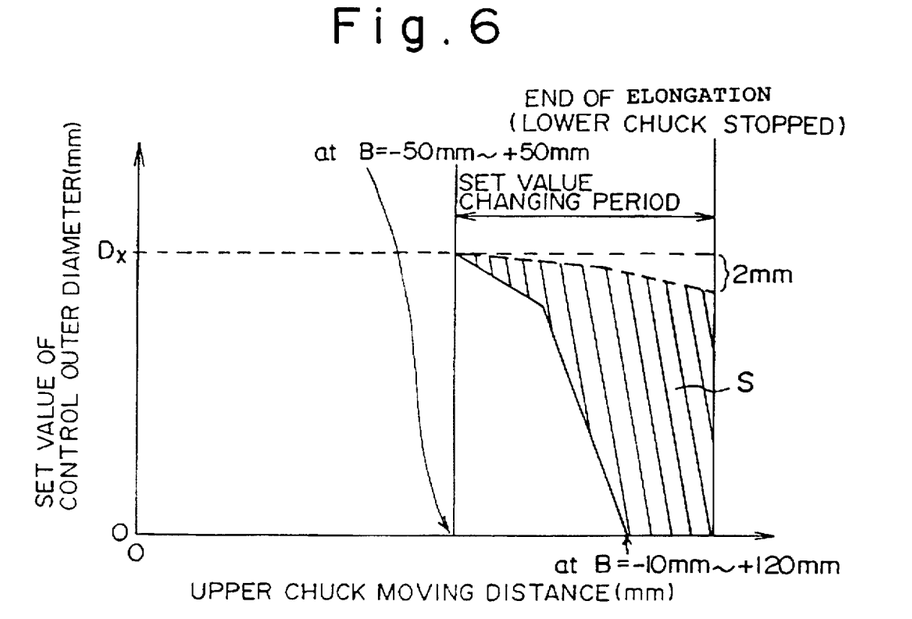
FIG. 6 is a graph showing change in a set value of control outer diameter with respect to moving distance of an upper chuck in the end portion elongating operation shown in the flow chart of FIG. 5.

Next, as shown in FIG. 3C, described with reference to a flow chart of FIG. 5, an end portion elongating operation during a period from the time when the interval B between the upper end of the glass preform 1 (portion indicated by the arrow P2 in the drawing) and the opening position Q of the heating furnace 9 becomes a predetermined value to the termination of the elongation operation. Here, in the following description, when the interval B is a negative number, the interval B shows a state that the upper end P2 of the steady portion 10 of the glass preform 1 does not reside in the heating furnace 9 yet as shown in FIG. 4A. On the other hand, when the interval B is a positive number, the interval B shows a state that the upper end P2 of the steady portion 10 of the glass preform 1 resides in the heating furnace 9 as shown in FIG. 4B.

In the steady state (state that a steady portion elongating operation for elongating the steady portion 10 of the glass preform 1 as shown in FIG. 3B is performed), the control unit 7 controls the driving motors 5 and 8 to coincide the measured value from the outer-diameter measuring device 6 with the set value of the control outer diameter (speed control of the upper and lower chucks 13 and 14). On the other hand, since the shape and size of the glass preform 1 set on the elongating apparatus of FIG. 2 is determined in advance, the control unit 7 monitors the interval B between the opening position Q of the heating furnace 9 and the upper end P2 of the steady portion 10 of the glass preform 1 up to the time when the elongation operation is terminated based on information concerning the glass preform 1 and a moving distance of the upper chuck 13 (Step ST1, ST2).

Then, when the above interval B is not less than a predetermined value "a", the control operation performed in the control unit 7 shifts from the steady portion elongating operation to an end portion elongating operation to change the set value of the control outer diameter in the steady state. In the end portion elongating operation, the set value of the control outer diameter is changed until the above interval B satisfies a predetermined condition (B≧β).

At the step of shifting from the steady state to this operation, the set value is decreased by a predetermined value (Step ST6), and the interval B is compared with the condition as to judge whether the interval B satisfies the condition or not (Step ST7). If the condition is not satisfied, the control unit 7 computes the interval B successively (Step ST3), and judges whether it is not lower than a value $a_i$ (i=1, 2, 3, . . . ; $\alpha_1 < \alpha_2 \alpha_3$ . . . ) defining the time that changes the set value or not (Step ST4). Thereafter, the control unit 7 repeats the value changing operation (Step ST3 to ST7) of the set value with incrementing the variable i until the condition is satisfied. In the specification, "the time when the elongation operation is terminated" refers to a time that at least the lower chuck 14 is stopped.

EMBODIMENT 1

Next, as a specific elongation operation, described is Embodiment 1 that elongates a glass preform 1 of 70 mm in diameter (diameter of a steady portion 10) to an elongated body 100 of 40 mm in diameter (diameter of a steady portion 110).

The prepared glass preform 1 is comprised of a cylindrical glass body (steady portion 10) having an outer diameter of 70 mm and a length of 500 mm, and conical glass portions (tapered portions 11a, 11b) each having a height (corresponding to a length in a longitudinal direction of the prepared glass preform 1) of 100 mm, the conical glass portions respectively attached to ends of the cylindrical glass body. Further, dummy rods 12a and 12b of 30 mm in outer diameter are connected to the end portions of the tapered portions 11a and 11b by fusion, respectively.

Here, an elongation condition in the steady state (a period of elongating the steady portion 10 of the glass preform 1 as shown in FIG. 3B) is as follows: setting speeds of the upper and lower chucks 13 and 14 are 10.0 mm/min and 30.6 mm/min, respectively; and a set value Dx of a control outer diameter is 44.0 mm.

In the elongation operation, while a speed ratio of the upper chuck 13 and the lower chuck 14 as described above was first kept 1.0:3.06, moving speeds of the upper and lower chucks 13 and 14 were elevated to the above setting speeds at the time required of 10 minutes (steady state shown in FIG. 3B). Thereafter, a feedback control (control of outer diameter) is performed by changing the moving speed of the upper chuck 13 so as to cancel the change of the outer diameter at a measured part 15 of a softened portion 200 while the moving speed of the lower chuck 14 was kept constant. The steady portion 10 of the prepared glass preform 1 was thereby elongated. Here, the control unit 7 performed the above control (a steady portion elongating operation) of outer diameter, and computed the interval B between the upper end P2 of the steady portion 10 and an opening position Q of a heating furnace 9 during the period based on determined information concerning the glass preform 1 and distance of movement of the upper chuck 13 in order to shift the steady portion elongating operation to an end portion elongating operation.

In the end portion elongating operation of Embodiment 1, when the interval B was 0 mm, the set value Dx of the control outer diameter in the steady state was decreased by 0.5 mm (set value: 43.5 mm); when the interval B was +20 mm, the set value was decreased by 0.5 mm (set value: 43.0 mm). Then, when the above interval B was +20 mm, the upper chuck 13 was stopped. Only the lower chuck 14 was further moved at the above set speed by 500 mm, and then the elongation operation was finished. Here, "a time when the elongation operation is terminated" refers to a time when at least the lower chuck 14 is stopped. In addition, the upper chuck 13 is stopped before the termination of elongation operation of Embodiment 1. This is performed when the set value of the above control outer diameter is set at 0 mm.

Figure 7:
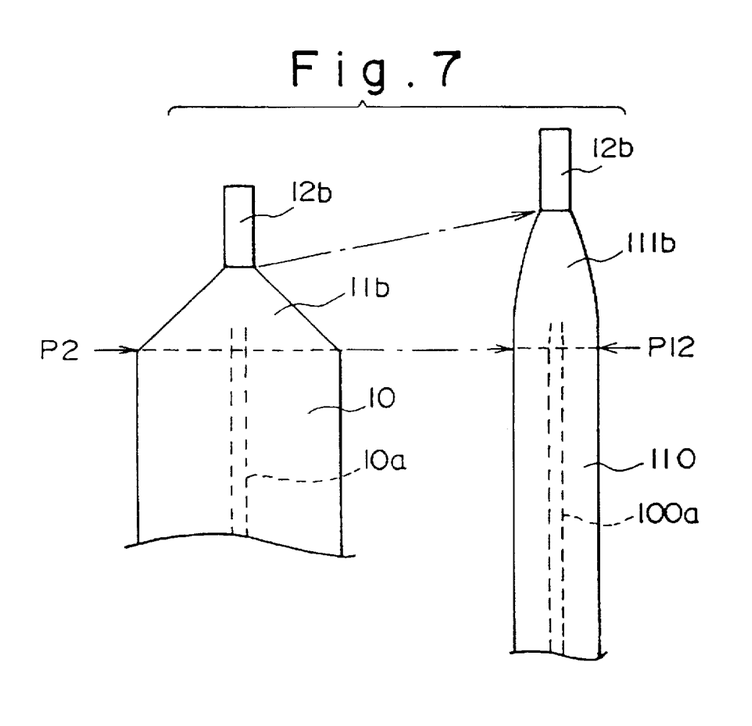
FIG. 7 is a view showing the exterior of an elongated body obtained by the elongating method according to the present invention.

As a result of Embodiment 1 described above, the end portion of the resulting elongated body 100 has the configuration shown in FIG. 7. As is apparent from this drawing, the outer diameter decreases smoothly from a steady portion 110 to a tapered portion 111b, whereby an elongated glass preform (elongated body 100) having a uniform outer diameter with a precision of 40 mm±1.0 mm is obtained.

EMBODIMENT 2

Next, described is Embodiment 2 that elongates a glass preform 1 of 130 mm in diameter (diameter of a steady portion 10) to an elongated body 100 of 70 mm in diameter (diameter of a steady portion 110).

The prepared glass preform 1 is comprised of a cylindrical glass body (steady portion 10) having an outer diameter of 130 mm and a length of 500 mm, and conical glass portions (tapered portions 11a, 11b) each having a height of 200 mm, the conical glass portions respectively attached to ends of the cylindrical glass body. Further, dummy rods 12a and 12b of 30 mm in outer diameter are connected to the end portions of the tapered portions 11a and 11b by fusion, respectively.

Here, an elongation condition in the steady state is as follows: setting speeds of upper and lower chucks 13 and 14 are 10.0 mm/min and 34.5 mm/min, respectively; a set value Dx of a control outer diameter is 78.0 mm.

In the elongation operation, while a speed ratio of the upper chuck 13 and the lower chuck 14 as described above was first kept 1.0:3.45, moving speeds of the upper and lower chucks 13 and 14 were elevated to the above set speeds at the time required of 10 minutes (steady state shown in FIG. 3B). Thereafter, while a feedback control (a steady portion elongating operation) was performed by changing the moving speed of the upper chuck 13 so as to compensate for the change of the outer diameter at a measured part 15 of a softened portion 200 in a state where the moving speed of the lower chuck 14 was kept constant, the steady portion 10 of the prepared glass preform 1 was elongated.

In the end portion elongating operation of Embodiment 2, when the interval B computed in the control unit 7 was −30 mm, a set value of the control outer diameter was decreased by 0.5 mm (set value: 77.5 mm); the set value was decreased by 0.5 mm each time the upper chuck 13 proceeded 10 mm (each time the above interval B was increased by 10 mm). Finally, when the interval B was set at 72.0 mm, the elongation operation was completed. Note that the upper chuck 13 did not stop up to the termination of elongation operation in Embodiment 2.

Start of the end portion elongating operation as described above is suitable when the value of the above interval B falls in the range of −50 mm to +50 mm. Also, it is preferable that the set value of the control outer diameter set finally is smaller than the set value Dx in the steady and the difference between the values is 2 mm or more. In the end portion elongating operation, the upper chuck 13 may stop at either time of −10 mm to +120 mm of the interval B. Accordingly, a range capable of providing the set value of the control outer diameter is a region indicated in oblique lines of FIG. 6.

Figure 8:
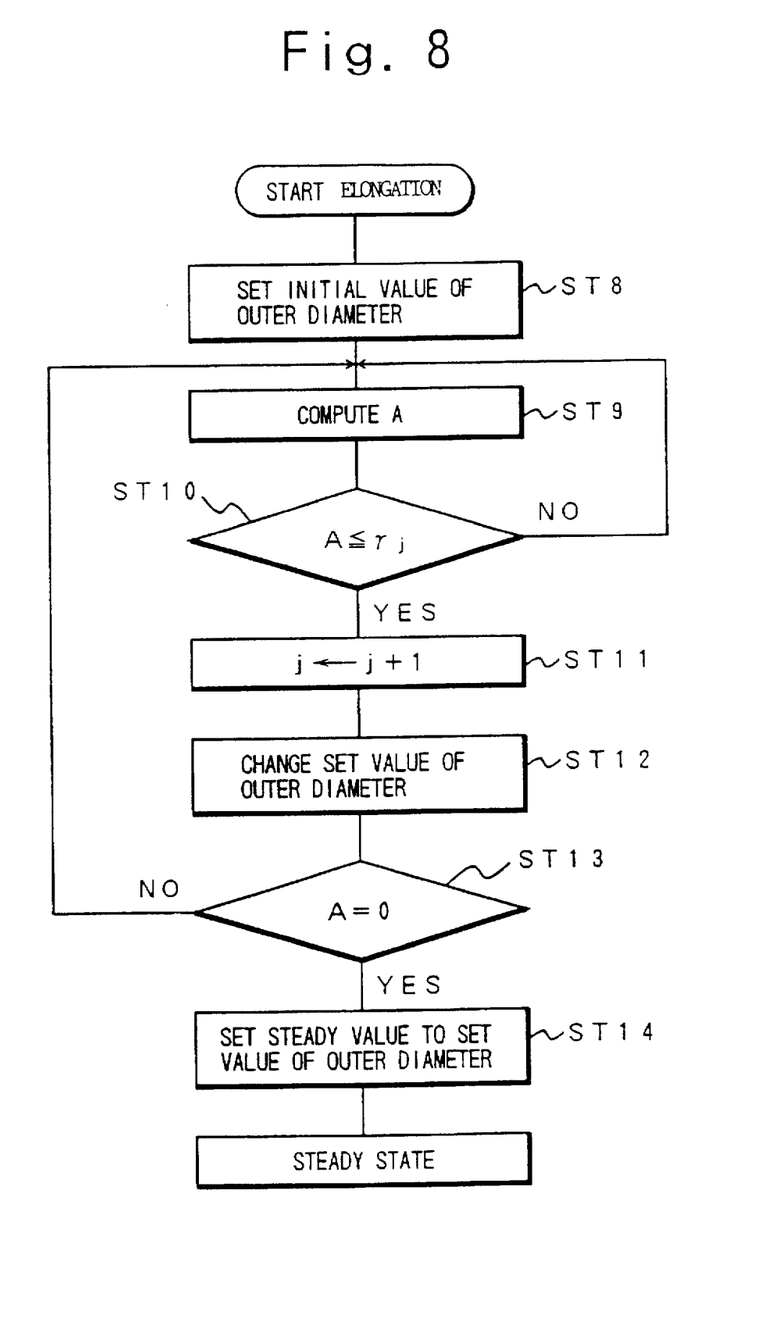
FIG. 8 is a flow chart summarizing an end portion elongating operation during a predetermined period from the start of elongation operation.
Figure 9:
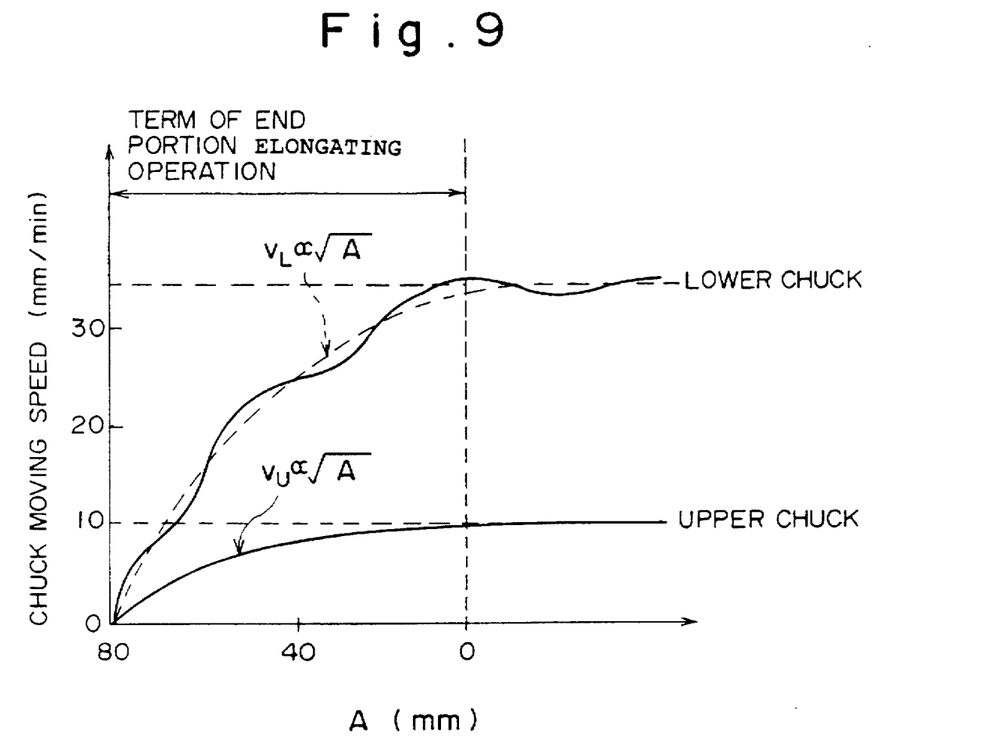
FIG. 9 is a graph showing a relationship of change in speed of upper and lower chucks with respect to the position of the glass preform in the end portion elongating operation shown in the flow chart of FIG. 8.

Next, an end portion elongating operation during a period from the start of elongation operation to a predetermined time is explained by use of a flow chart of FIG. 8.

First, the glass preform 1 is set at an initial preform position $\gamma_1$, which corresponds to an initial interval between a lower end P1 of the steady portion 10 of the glass preform 1 at the time of setting the glass preform 1 to the apparatus of FIG. 2 and an opening position Q of the heating furnace 9, and an initial value of control outer diameter is set (Step ST8). Thereafter, the upper chuck 13 and lower chuck 14 are moved at respective predetermined speeds (start of elongation operation of the glass preform 1) in a state that a heating furnace 9 is heated sufficiently.

At this time, in addition to controlling the moving speeds of the above upper and lower chucks 13 and 14, the control unit 7 computes an interval A between a lower end P1 of the steady portion 10 of the glass preform 1 predetermined in the shape and dimension and an opening position Q of the heating furnace 9, based on the distance of movement of the upper chuck 13 (Step ST9). The control unit 7 compares the preform position $\gamma_j$ (j=1, 2, 3, . . . : $\gamma_1 > \gamma_2 > \gamma_3 > \ldots > 0$) defining a time of changing the set value of the control outer diameter with the interval A (Step ST10). At this time, if the interval A is less than $\gamma_j$, the control unit 7 increments the variable j (Step ST11), while changing the set value of the control outer diameter (Step ST12). Then at the time that the interval A is finally 0 mm (Step ST13), the control unit 7 sets the set value Dx of the control outer diameter in the steady state (Step ST14), then shifting to the steady portion elongating operation in the steady state.

Here, though A=0 is set as a condition of termination of the above end portion elongating operation, this termination condition may be a negative value when the length in a longitudinal direction of the tapered portion of lower end 11a of the glass preform 1 is short (state that the lower end P1 of the steady portion 10 is located in the heating furnace 9).

EMBODIMENT 3

Next, described is Embodiment 3 (same condition as that of Embodiment 2) that elongates a glass preform 1 of 130 mm in diameter (diameter of a steady portion 10) to an elongated body 100 of 70 mm in diameter (diameter of a steady portion 110).

The prepared glass preform 1 is comprised of a cylindrical glass body (steady portion 10) having an outer diameter of 130 mm and a length of 500 mm, and conical glass portions (tapered portions 11a, 11b) each having a height of 200 mm, the conical glass portions respectively attached to ends of the cylindrical glass body. Further, dummy rods 12a and 12b of 30 mm in outer diameter are connected to the end portions of the tapered portions 11a and 11b by fusion, respectively.

Here, an elongation condition in the steady state is as follows: setting speeds of the upper and lower chucks 13 and 14 are 10.0 mm/min and 34.5 mm/min, respectively; and a set value Dx of an outer diameter of control is 78.0 mm.

In the end portion elongating operation performed during a period from the start of elongation operation to a predetermined time, the glass preform 1 was first set at the position of A=+80 mm. Then, the upper chuck 13 and lower chuck 14 are driven while an initial speed ratio is 1.0:3.45. In the meantime, the control unit 7 performed feedback control (control of outer diameter) such that the moving speed of the lower chuck 14 varied to cancel the change of the outer diameter at a measured part 15 of a softened portion 200 while increasing the moving speed of the upper chuck 13 at a constant speed (see FIG. 9).

In the end portion elongating operation, the set value at the time the elongation operation was started (A=+80 mm) was set at 74 mm; the set value of the control outer diameter was increased 0.5 mm each time the upper chuck 13 proceeded 10 mm (each time the interval A decreased 10 mm); finally the set value was 78 mm (=Dx) at the time of the interval A was 0 mm.

Figure 10A:
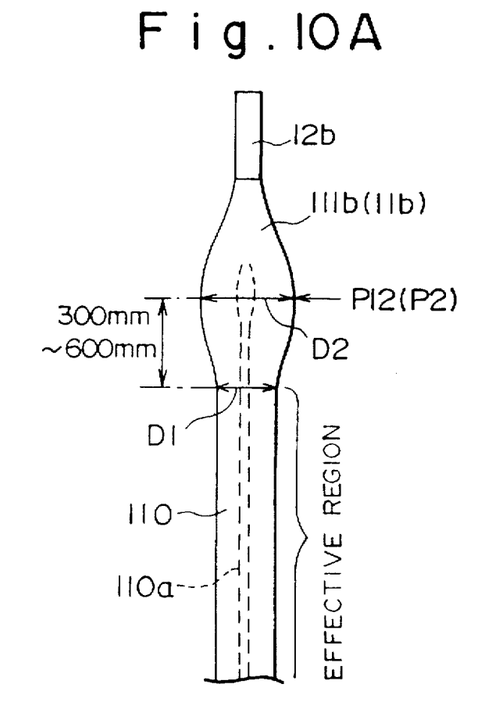
FIGS. 10A and 10B are views showing exteriors of the respective end portions of an elongated body when the elongating method according to the present invention is not performed.
Figure 10B:
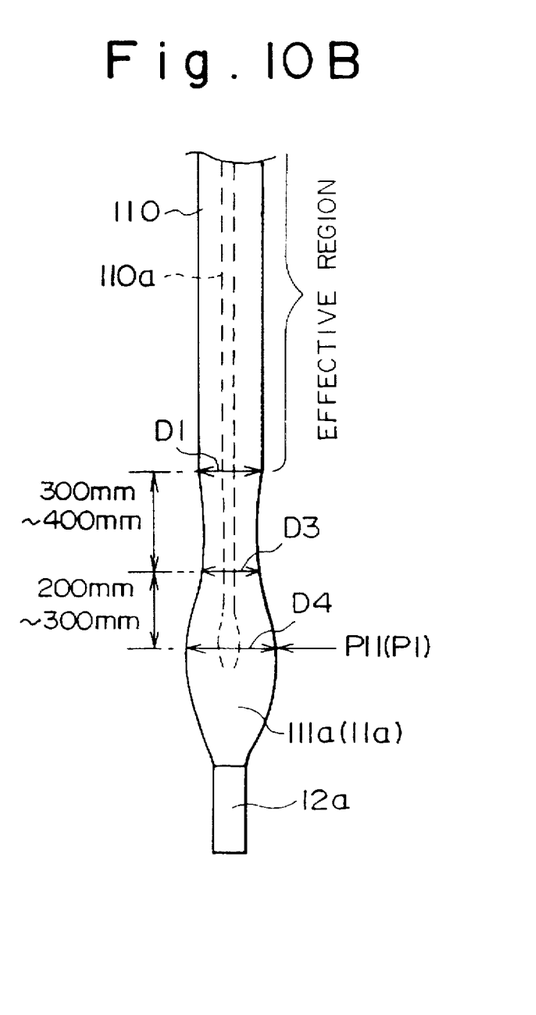

For comparison, appearances of end portions of elongated bodies obtained by elongating methods not performing the aforementioned end portion elongating operation are shown in FIG. 10A and FIG. 10B.

FIG. 10A shows the end portion of an elongated body (Comparative Examples 1 and 2) formed by elongating under the elongation condition of the same steady state as those of Embodiments 1 and 2; FIG. 10B shows the end portion (Comparative Example 3) of an elongated body formed by elongating under the elongation condition which is the same as that of Embodiment 3.

As shown in FIG. 10A, according to Comparative Examples 1 and 2, when the end portion elongating operation of Embodiments 1 and 2 was not performed, the upper end of each of the elongated bodies was thick. Specifically, in Comparative Example 1 (using the preform of Embodiment 1), an outer diameter D2 of the upper end was thicker by about 10 to 15 mm than an outer diameter (finished outer diameter) D1 of the steady portion 110 of the elongated body. Also, in Comparative Example 2 (using the preform of Embodiment 2), the outer diameter D2 of the upper end was thicker by 5 to 8 mm than D1. For this reason, an effective region of the elongated body is shorter by about 300 mm to 600 mm than that of the elongated body obtained by the elongating method according to the present invention. On the other hand, as shown in FIG. 10B, Comparative Example 3 confirmed that when the elongating operation of the present invention is not performed the lower end is thicker with partially causing "neck down." In Comparative Example 3, an outer diameter D4 of the thicker portion is thicker by about 3 mm to 5 mm than the outer diameter (finished outer diameter) D1 of the steady portion 110, while an outer diameter D3 of the section causing "neck down" is thinner by about 1 mm than D1. For this reason, the effective region of the elongated body is shorter by about 500 mm to 700 mm than that of the elongated body obtained by the elongating method according to the present invention.

Fluctuation in outer diameter of the resulting elongated body is studied below. It is assumed that, when the outer diameter is typically measured at a part of the softened portion 200 near the steady portion 110 of the elongated body 100, the difference between the control outer diameter and the finished outer diameter may become smaller, thereby improving the precision in finished outer diameter and reducing the fluctuation in outer diameter. However, moving the measured part 15 farther from the heated portion 3 thereby lowers the viscosity and deteriorates the response of this part to a tensile stress. As a result, it becomes difficult to control stably the finished outer diameter.

By contrast, when the measured part 15 is positioned near the heated portion 3, though controllability becomes favorable, the difference between a value of the control outer diameter and the finished outer diameter is so large that when the outer diameter before elongation has changed, for example, it tends to influence the finished outer diameter, thereby easily causing fluctuation in outer diameter. Accordingly, as a trade-off between the response of control and stability in outer-diameter fluctuation, in general the outer diameter is measured at an optimal position empirically found within the range of the softened portion 200 having a taper form, which is separated from the heated portion 3 of the glass preform 1 by a predetermined distance of movement, so as to control the pulling speed (depending on the moving speed of the lower chuck 14).

As a result, since the measured part 15 is separated from the heated portion 3, when the pulling speed is controlled so as to make the outer diameter at the measured part 15 coincide with the set value of the control outer diameter, its effect is exhibited most remarkably at the heated center portion 210, while failing to be detected after the moving time from the heated center portion 210 to the measured part 15 is passed. Consequently, the control instruction cannot be fed back.

In a case where the proximity of the tapered portion 11a in a conical form located near the lower end P1 of the glass preform 1 is elongated, when the outer diameter at the heated center portion 210 approximates the outer diameter at the time of the steady portion elongating operation, the positional relationship is such that the outer diameter at the measured part 15 is much smaller than the value of the control outer diameter at the time of the steady portion elongating operation. Consequently, the moving speed of the lower chuck 14 is controlled so as to become smaller. Nevertheless, since the outer diameter at the heated center portion 210 is not so different from that of the steady portion 110 of the glass preform 1, the finished outer diameter becomes thicker inversely.

By contrast, the reason why the upper end of the elongated body (portion corresponding to the tapered portion 11b located near the upper end P2 of the glass preform 1) becomes thicker essentially differs from that mentioned above because the relationship in dimension between the outer diameter at the softened portion 200 and that at the measured part 15 are inverse to each other at the upper and lower ends of the glass preform 1.

As described above, the control outer diameter is set taking a determined reduction in diameter from the measured outer diameter at the measured part 15 to the finished outer diameter into consideration. However, the magnitude of this reduction in diameter varies in response to the outer diameter of the glass preform 1 as follows: the larger the outer diameter of the glass preform 1, the larger the reduction in diameter; the smaller the outer diameter of the glass preform 1, the smaller the reduction in diameter.

In a case where the proximity of the conical tapered portion 11b located near the upper end P2 of the glass preform 1 is elongated, since the outer diameter at the softened portion 200 gradually reduces (due to heating the conical tapered portion 11b), the difference between the outer diameter at the measured part 15 and the finished outer diameter becomes smaller. Since the outer diameter at the measured part 15 is controlled so as to coincide with the value of the control outer diameter in this state, the finished outer diameter becomes thicker.

Namely, in a case where the proximity of the conical end portion 11b located near the upper end P2 of the glass preform 1 is elongated, when the outer diameter at the measured part 15 becomes smaller than the set value of the control outer diameter, the upper chuck 13 or lower chuck 14 is controlled such that the elongation speed becomes slower. However, in this case, since the part which has already passed through the measured part 15 and whose outer diameter approximates that of the steady portion 110 of the glass preform 1 still has a high temperature and a low viscosity, it is influenced by reduction in moving speed, consequently attaining a thicker finished outer diameter.

As a conventional method of elongating the glass preform near the tapered portions 11a and 11b, that disclosed in Japanese Patent Application Laid-Open No. 4-83728 has been known, for example, though these problems have not sufficiently been overcome yet.

Though the foregoing embodiment relates to a case where the diameter of the glass preform 1 at its steady portion 10 is constant, without being restricted thereto, the present invention is also applicable to a case where the diameter at the steady portion 10 changes.

Also in the above embodiment, when the end portion 11a located near the lower end P1 of the glass preform 1 is elongated, the moving speed of the upper chuck 13 is constant and the moving speed of the lower chuck 14 is controlled. As a modification of this embodiment, the moving speed of the upper chuck 13 may be reduced in response to an increase in outer diameter of the tapered portion 11a. The latter operation is effected in order to change the moving speeds of the chucks 13 and 14 in response to change in heat capacity due to change in outer diameter of the glass preform 1, thereby making the viscosity of the softened portion 200 as constant as possible so as to yield a finished outer diameter with a further higher precision.

For the same reason, when the tapered portion 11b located near the upper end P2 of the glass preform 1 is to be elongated, the moving speed of the upper chuck 13 may be controlled in a state where the moving speed of the lower chuck 14 is set so as to increase in response to reduction in outer diameter.

In accordance with the present invention, even when the outer diameter of the glass preform before elongation is not uniform, an elongated body having a very uniform outer diameter throughout its length can be obtained, allowing resources to be effectively utilized.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 317810/1995 filed on Dec. 6, is hereby incorporated by reference.

What is claimed is:

1. A method of forming an elongated glass body, said method comprising the steps of:

preparing a glass preform, the glass preform including a steady portion with a length extending in a longitudinal direction of the glass preform and having a uniform outer diameter along the length, a first tapered portion with a first tapering outer diameter, and a second tapered portion with a second tapering outer diameter, each of the first and second tapering outer diameters being smaller than the uniform outer diameter, the first tapered portion and the second tapered portion being disposed on a first end and a second end of the steady portion, respectively;

feeding the glass preform into a heater at a first speed so that the first tapered portion is fed to the heater before the second tapered portion, the heater operating at a temperature sufficient to heat and soften the glass preform;

moving the glass preform through the heater along an advancing direction and thereby heating and softening the glass preform with the heater at predetermined parts of the glass preform as the predetermined parts move through the heater in a successive manner along the advancing direction;

discharging the glass preform from the heater at a second speed which is faster than the first speed and thereby applying tensile stress to the glass preform to elongate the glass preform; and measuring at a predetermined position a measured value of an outer diameter for each of the predetermined parts subjected to said heating and softening steps as the predetermined parts successively move by the predetermined position and, based upon a comparison between the measured value and a preset value of a control outer diameter, adjusting at least one of the first and second speeds so that the measured value corresponds to the preset value, wherein at least a first portion of said step of adjusting is conducted during a first period of time from when a distance between the second end of the steady portion and an opening of the heater is a first value to when said step of moving is terminated, so that the first period of time encompasses a second period of time during which the second tapered portion is moved through the opening, and wherein during said first portion of said step of adjusting, said process further comprises decreasing the preset value of the control outer diameter in a first stepwise manner in response to a distance of movement of the glass preform in the advancing direction.

2. A method according to claim 1, wherein said step of feeding is stopped from a predetermined time until the time when said step of moving is terminated.

3. A method according to claim 1, wherein a second portion of said step of adjusting is conducted during a third period of time from when said step of moving is started to when a distance between the first end of the steady portion and the opening of the heater is a second value, so that the third period of time encompasses a fourth period of time during which the first tapered portion is moved through the opening of the heater, and wherein during said second portion of said step of adjusting said process further comprises increasing the preset value of the control outer diameter in a second stepwise manner in response to the distance of movement of the glass preform in the advancing direction while the glass preform is in the heater.

4. A method according to claim 3, wherein said step of feeding is stopped from a predetermined time until the time when said step of moving is terminated.

5. A method of forming an elongated glass body, said method comprising the steps of:

preparing a glass preform, the glass preform including a steady portion with a length extending in a longitudinal direction of the glass preform and having a uniform outer diameter along the length, a first tapered portion with a first tapering outer diameter, and a, second tapered portion with a second tapering outer diameter, each of the first and second tapering outer diameters being smaller than the uniform outer diameter, the first tapered portion and the second tapered portion being disposed on a first end and a second end of the steady portion, respectively;

feeding the glass preform into a heater at a first speed so that the first tapered portion is fed to the heater before the second tapered portion, the heater operating at a temperature sufficient to heat and soften the glass preform;

moving the glass preform through the heater along an advancing direction and thereby heating and softening the glass preform with the heater at predetermined parts of the glass preform as the predetermined parts move through the heater in a successive manner along the advancing direction;

discharging the glass preform from the heater at a second speed which is faster than the first speed and thereby applying tensile stress to the glass preform to elongate the glass preform; and measuring at a predetermined position a measured value of an outer diameter for each of the predetermined parts subjected to said heating and softening steps as the predetermined parts successively move by the predetermined position and, based upon a comparison between the measured value and a preset value of a control outer diameter, adjusting at least one of the first and second speeds so that the measured value corresponds to the preset value, wherein at least a first portion of said step of adjusting is conducted during a first period of time from when said step of moving is started to when a distance between the first end of the steady portion and an opening of the heater is a first value, so that the first period of time encompasses a second period of time during which the first tapered portion is moved through the opening, and wherein during said first portion of said step of adjusting, said process further comprises increasing the preset value of the control outer diameter in a stepwise manner in response to a distance of movement of the glass preform in the advancing direction.

6. A method according to claim 5, wherein said step of feeding is stopped from a predetermined time until the time when said step of moving is terminated.

* * * * *